US011570626B2

(12) United States Patent
Chandramouli et al.

(10) Patent No.: US 11,570,626 B2
(45) Date of Patent: Jan. 31, 2023

(54) METHODS AND APPARATUSES FOR DYNAMICALLY UPDATING ROUTING IDENTIFIER(S)

(71) Applicant: Nokia Technologies Oy, Espoo (FI)

(72) Inventors: Devaki Chandramouli, Plano, TX (US); Suresh Nair, Whippany, NJ (US); Laurent Thiebaut, Antony (FR)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/973,695

(22) PCT Filed: Jun. 25, 2019

(86) PCT No.: PCT/US2019/038962
§ 371 (c)(1),
(2) Date: Dec. 9, 2020

(87) PCT Pub. No.: WO2020/005925
PCT Pub. Date: Jan. 2, 2020

(65) Prior Publication Data
US 2021/0258797 A1 Aug. 19, 2021

Related U.S. Application Data

(60) Provisional application No. 62/690,095, filed on Jun. 26, 2018.

(51) Int. Cl.
G06F 21/00 (2013.01)
H04W 12/73 (2021.01)
(Continued)

(52) U.S. Cl.
CPC ....... H04W 12/73 (2021.01); H04W 12/0431 (2021.01); H04W 12/06 (2013.01); H04W 12/102 (2021.01); H04W 84/042 (2013.01)

(58) Field of Classification Search
CPC .......................... H04L 9/3242; H04L 9/0838
See application file for complete search history.

(56) References Cited

U.S. PATENT DOCUMENTS 7,441,271 B2 * 10/2008 Fiatal ................... H04L 9/0827
726/22
10,536,844 B2 * 1/2020 Park ..................... H04W 8/205
(Continued)

FOREIGN PATENT DOCUMENTS

CN 108683510 A 10/2018
JP 2019-525579 A1 9/2019
(Continued)

OTHER PUBLICATIONS

Ghavimi et al., "M2M Communications in 3GPP LTE/LTE-A Networks: Architectures, Service Requirements, Challenges, and Applications", IEEE Communications Surveys & Tutorials, vol. 17, Issue: 2, Secondquarter (Year: 2015).*
(Continued)

Primary Examiner — Morshed Mehedi
(74) Attorney, Agent, or Firm — Alston & Bird LLP

(57) ABSTRACT

Systems, methods, apparatuses, and computer program products for dynamically updating routing identifiers (IDs) are provided. One method may include deciding, at a network node, to update a routing identifier for at least one user equipment. The method may then include obtaining or generating a new routing identifier to be assigned to the at least one user equipment along with authentication vectors, and transmitting the new routing identifier to an authentication entity.

16 Claims, 5 Drawing Sheets

(51) Int. Cl.
*H04W 12/0431* (2021.01)
*H04W 12/102* (2021.01)
*H04W 12/06* (2021.01)
*H04W 84/04* (2009.01)

(56) References Cited

U.S. PATENT DOCUMENTS

| | | | |
|---|---|---|---|
| 2008/0222696 A1* | 9/2008 | Nicodemus | H04L 63/102 726/1 |
| 2010/0002633 A1* | 1/2010 | Nishida | H04W 8/12 370/328 |
| 2012/0167160 A1* | 6/2012 | Carney | H04L 45/02 726/1 |
| 2013/0061046 A1 | 3/2013 | Joy et al. | |
| 2017/0079086 A1* | 3/2017 | Kuge | H04W 8/005 |
| 2018/0376445 A1 | 12/2018 | Yoon et al. | |
| 2019/0261453 A1* | 8/2019 | Jain | H04W 8/08 |
| 2021/0195509 A1* | 6/2021 | Ohlsson | H04W 12/02 |

FOREIGN PATENT DOCUMENTS

| | | | | |
|---|---|---|---|---|
| KR | 1020090087950 A | | 8/2009 | |
| WO | WO-2015197099 A1 | * | 12/2015 | H04L 12/4641 |

OTHER PUBLICATIONS

"3rd Generation Partnership Project; Technical Specification Group Services and System Aspects; System Architecture for the 5G System; Stage 2 (Release 15)", 3GPP TS 23. 501, v15.2.0, Jun. 2018, pp. 1-217.

"3rd Generation Partnership Project; Technical Specification Group Services and System Aspects; Security architecture and procedures for 5G system (Release 15)", 3GPP TS 33.501, V15.0.0, Mar. 2018, pp. 1-128.

International Search Report and Written Opinion received for corresponding Patent Cooperation Treaty Application No. PCT/US2019/038962, dated Sep. 4, 2019, 15 pages.

"TS 23.502: Handling of PDU Sessions at Slice Unavailability", SA WG2 Meeting #121, S2-173106, Agenda: 6.5.3, Qualcomm Incorporated, May 15-19, 2017, pp. 1-31.

"3rd Generation Partnership Project; Technical Specification Group Services and System Aspects; Study on Enhancement to the 5GC LoCation Services (Release 16)", 3GPP TR 23.731, V0.4.0, Jun. 2018, pp. 1-107.

Office Action for European Application No. 19739817.5 dated Jun. 22, 2022, 8 pages.

Office Action for Japanese Application No. 2020-571761 dated Mar. 24, 2022, 5 pages.

Notice of Allowance for Korean Application No. 10-2021-7002367 dated Oct. 20, 2021, 3 pages.

First Examination Report for Indian Application No. 202147000944 dated Jan. 4, 2022, 6 pages.

Nec et al., SA2: Analysis on UDM/AUSF Discovery (Agenda 6.5.4), S2-186078, (Jun. 2, 2018), 8 pages.

Qualcomm Incorporated, "Simplified Symmetric Key Privacy Solution That Enables Routing To Multiple AUSFs", 3GPP TSG SA WG3 (Security) Meeting #87, S3-171327, (May 15-19, 2017), 3 pages.

Huawei, "Clarification on Routing Id", 3GPP TSG-RAN WG2 Meeting #69, R2-101023, (Feb. 22-26, 2010), 2 pages.

* cited by examiner

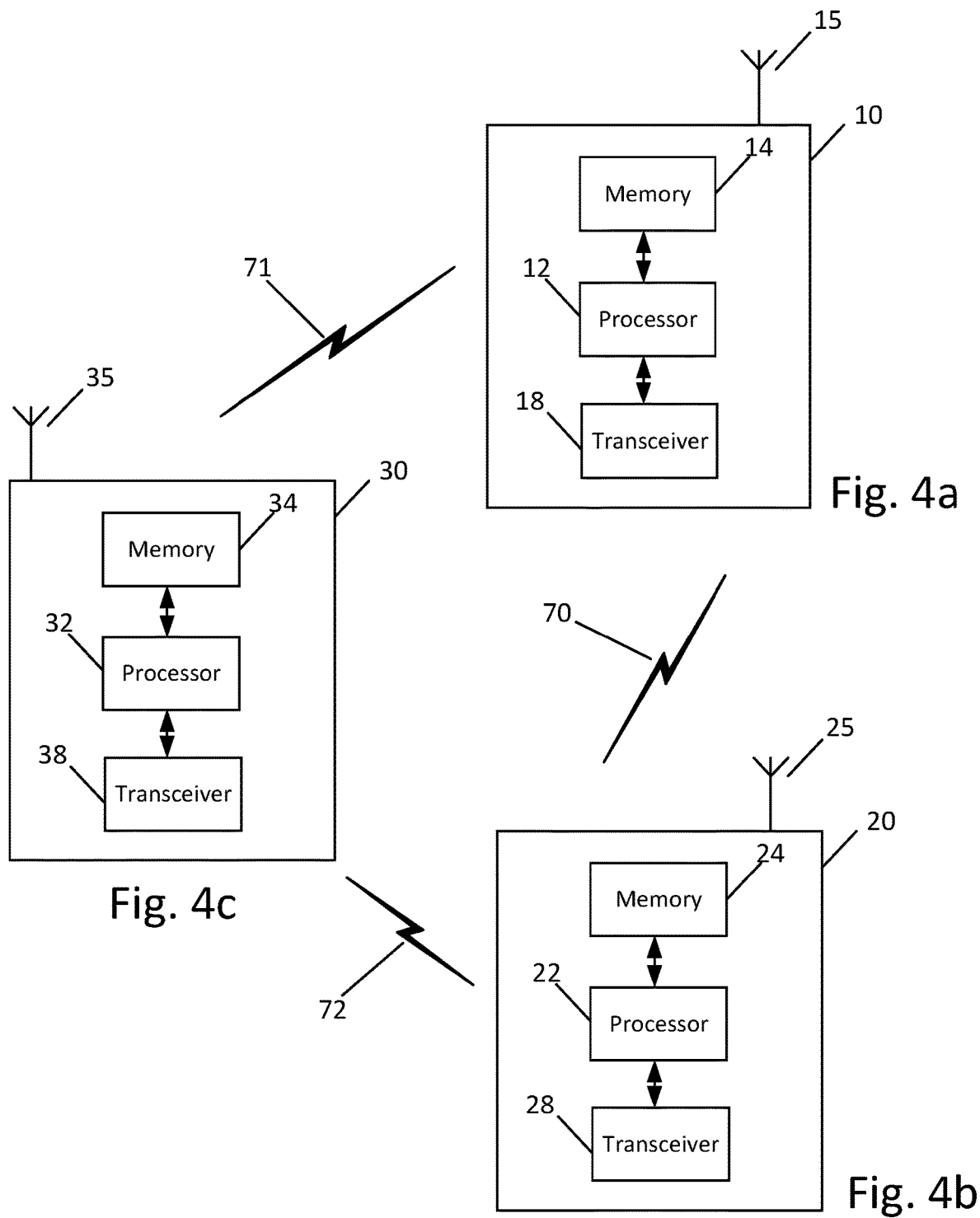

METHODS AND APPARATUSES FOR DYNAMICALLY UPDATING ROUTING IDENTIFIER(S)

RELATED APPLICATION

This application claims priority to PCT Application No. PCT/US2019/038962, filed on Jun. 25, 2019, which claims priority to U.S. Provisional Application No. 62/690,095, filed on Jun. 26, 2018, each of which is incorporated herein by reference in its entirety.

CROSS-REFERENCE TO RELATED APPLICATIONS

This application claims priority from U.S. provisional patent application No. 62/690,095 filed on Jun. 26, 2018. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to redundant transmissions in such systems.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment may be directed to a method that may include deciding, by a network node, to update a routing ID for at least one UE. The method may then include obtaining or generating the new routing ID to be assigned to the at least one UE. The method may further include transmitting the new routing ID to an authentication entity.

Another embodiment may be directed to an apparatus that may include at least one processor and at least one memory comprising computer program code. The at least one memory and computer program code may be configured, with the at least one processor, to cause the apparatus at least to decide to update a routing ID for at least one UE, obtain the new routing ID to be assigned to the at least one UE, and transmit the new routing ID to an authentication entity.

Another embodiment may be directed to a method that may include receiving, by a network entity, a new routing ID for at least one UE. The method may then include storing the new routing ID assigned to the at least one UE, encrypting the new routing ID with a specific key, and transmitting the encrypted new routing ID parameter to a security or access management entity. In an embodiment, the encrypted new routing ID may be transmitted with an additional integrity signature (MAC-Routing ID) to ensure that the content is not altered in the transmission process.

Another embodiment may be directed to an apparatus that may include at least one processor and at least one memory comprising computer program code. The at least one memory and computer program code may be configured, with the at least one processor, to cause the apparatus at least to receive a new routing ID for at least one UE, store the new routing ID assigned to the at least one UE, encrypt the new routing ID with a specific key, and transmit the encrypted new routing ID parameter to a security or access management entity. In an embodiment, the encrypted new routing ID may be transmitted with an additional integrity signature (MAC-Routing ID) to ensure that the content is not altered in the transmission process.

Another embodiment may be directed to a method that may include receiving, by a UE, an encrypted new routing ID with an additional integrity signature (MAC-Routing ID) from a security or access management entity. The method may then include checking the validity of the MAC-Routing ID using a key derived from an AKA procedure and, if the MAC-Routing ID is valid, the method may then include deciphering and storing the new routing ID.

Another embodiment may be directed to an apparatus that may include at least one processor and at least one memory comprising computer program code. The at least one memory and computer program code may be configured, with the at least one processor, to cause the apparatus at least to receive an encrypted new routing ID with an additional integrity signature (MAC-Routing ID) from a security or access management entity, check the validity of the MAC-Routing ID using a key derived from an AKA procedure and, if the MAC-Routing ID is valid, decipher and store the new routing ID.

BRIEF DESCRIPTION OF THE DRAWINGS

For proper understanding of example embodiments, reference should be made to the accompanying drawings, wherein:

FIG. 4a illustrates an example block diagram of an apparatus, according to an embodiment;

FIG. 4b illustrates an example block diagram of an apparatus, according to an embodiment; and FIG. 4c illustrates an example block diagram of an apparatus, according to an embodiment.

DETAILED DESCRIPTION

Figure 1:
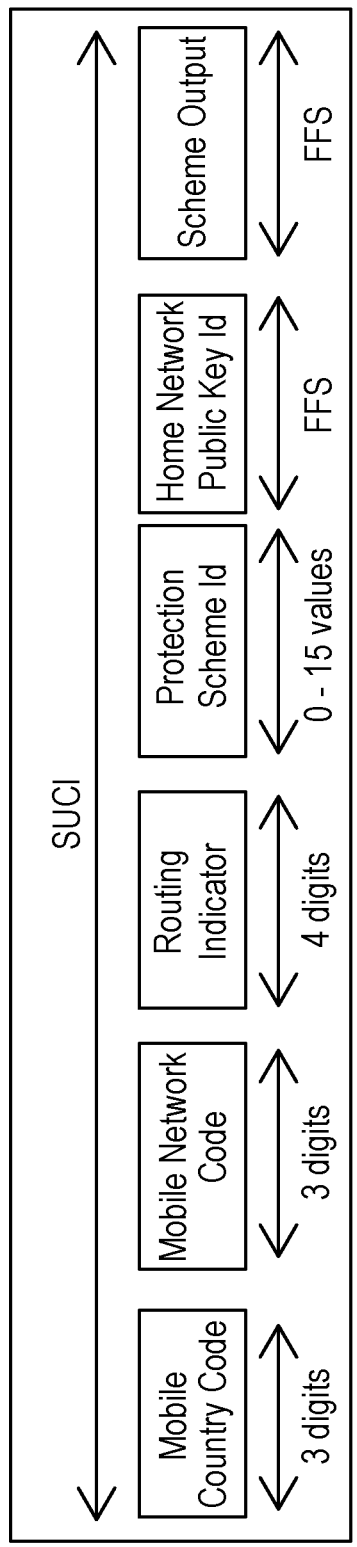
FIG. 1 illustrates an example of the format of a SUCI.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products to dynamically update routing identifiers (IDs), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

A user equipment (UE) may provide an encrypted form of its subscription permanent identifier (SUPI), referred to as a subscription concealed identifier (SUCI) (which is the UE ID, see 3GPP TS 23.501), to the network. When a UE provides the SUCI to the network, there needs to be a way to discover and select the authentication server function (AUSF) and/or unified data management (UDM) instance that has access to the UE's subscription, security credentials and SUCI decryption key in order to decrypt the SUCI and retrieve the security credentials of the UE. This is enabled by a routing identifier (ID) parameter that is pre-configured on the UE, provided by the UE to the network in a non-ciphered way within the SUCI, and used in the network to determine a proper AUSF and/or UDM instance that after having decrypted the SUCI can initiate the UE authentication (thus has a direct access to the security related storage).

Routing ID to AUSF Group ID and Routing ID to UDM Group ID mapping is expected to be stored within the network by the operator, e.g., via operations & management (OA&M) in the network repository function (NRF) or during network function (UDM and/or AUSF) Registration with the NRF. The 3GPP standards allow for the Routing ID and Group ID to change independently of each other. Subscriber migration from one AUSF Group to another AUSF Group, one UDM Group to another UDM Group should not require re-configuration of SUCI in the UE.

FIG. 1 illustrates an example of the format of a SUCI. As illustrated in FIG. 1, the SUCI may include the mobile country code, mobile network code, routing ID, protection scheme ID, home network public key ID, and scheme output.

If there is a change in Routing ID configuration and/or change in the configuration of the Routing ID <-> Group ID mapping for one or more UE(s), then the current assumption is that the mapping in the NRF for Routing ID <-> Group ID will have to be updated. This is fine as long as the configuration is updated for all the associated (millions of) UE(s), but this is not optimal if the change in configuration is just for a subset of UE(s).

One requirement with the Routing ID is also that the Routing ID should map to a group of UE(s) and it should not reveal the privacy of the UE. Furthermore, the use of the same routing ID value has the risk of revealing information on the class of UE to SUCI catchers. Thus, there needs to be a mechanism to update the Routing ID for a single UE, subset of UE(s), and/or all the UE(s) that are assigned to a given Routing ID. Also, if the Routing ID value provided by the UE is not correct, then there is a risk that the network has to find the UDM using a trial and error method, which might require re-routing.

Furthermore, the current assumption for Routing ID is that the operator is configuring the Routing ID in the UE using over the air (OTA) or open mobile alliance device management (OMA-DM) configuration. This is quite suboptimal as it requires significant manual intervention. First, the operator staff needs to know when such a configuration is changing; second, the operator staff needs to invoke a dedicated configuration method just for this purpose.

In view of the above, one embodiment provides a method for flexible assignment of a Routing ID. For example, certain embodiments provide a mechanism to update the Routing ID (that is part of the SUCI) in the UE as part of the non-access stratum (NAS) procedures that take place with the UE, such as the registration procedure, authentication procedure, and/or UE configuration update. For example, during the registration procedure, the network can provide the routing ID update in the registration accept message. As another example, during the authentication procedure, the network can provide the routing ID update in the authentication accept message. As yet another example, during a UE configuration update, the network can provide an updated routing ID as part of UE configuration update. It is noted that these options can be combined in any suitable manner.

In some embodiments, the update of the routing ID may be performed under at least the following scenarios: (1) Operator changes the Routing ID configuration for one or more UE(s), (2) Operator changes Routing ID configuration due to change in Routing ID mapping to Group ID, and/or (3) UE provides a wrong Routing ID value (i.e., out of sync scenario). In other words, one or more of these scenarios may trigger the update to the routing ID.

Certain embodiments may also provide security for the Routing ID assignment. It is noted that the home public land mobile network (HPLMN) assigns the Routing ID for a given UE. Thus, if the UE is roaming when this update is performed, the Routing ID should be provided in a secure manner. When the UE is authenticated in the visited public land mobile network (VPLMN), the AUSF (under HPLMN control) stores a copy of the AUSF key (KAusF) for future use. This key is known only by the AUSF and the UE. One embodiment may use this key directly, or use another encryption key derived from this key, to encrypt and a separate integrity key to integrity protect the Routing ID information sent to the UE. The fresh Routing ID from the HPLMN may be contained within a container and encrypted in the message sent towards the UE, during any of the procedures mentioned above. Since the Routing ID information is protected by the keys known only between the UE and the AUSF present in the HPLMN, any tampering with this Routing ID assignment by the VPLMN is prevented (i.e., otherwise, if the VPLMN messes up the value, there is a risk that the UE is provided with a wrong value and, thus, tampering should be prohibited).

Figure 2:
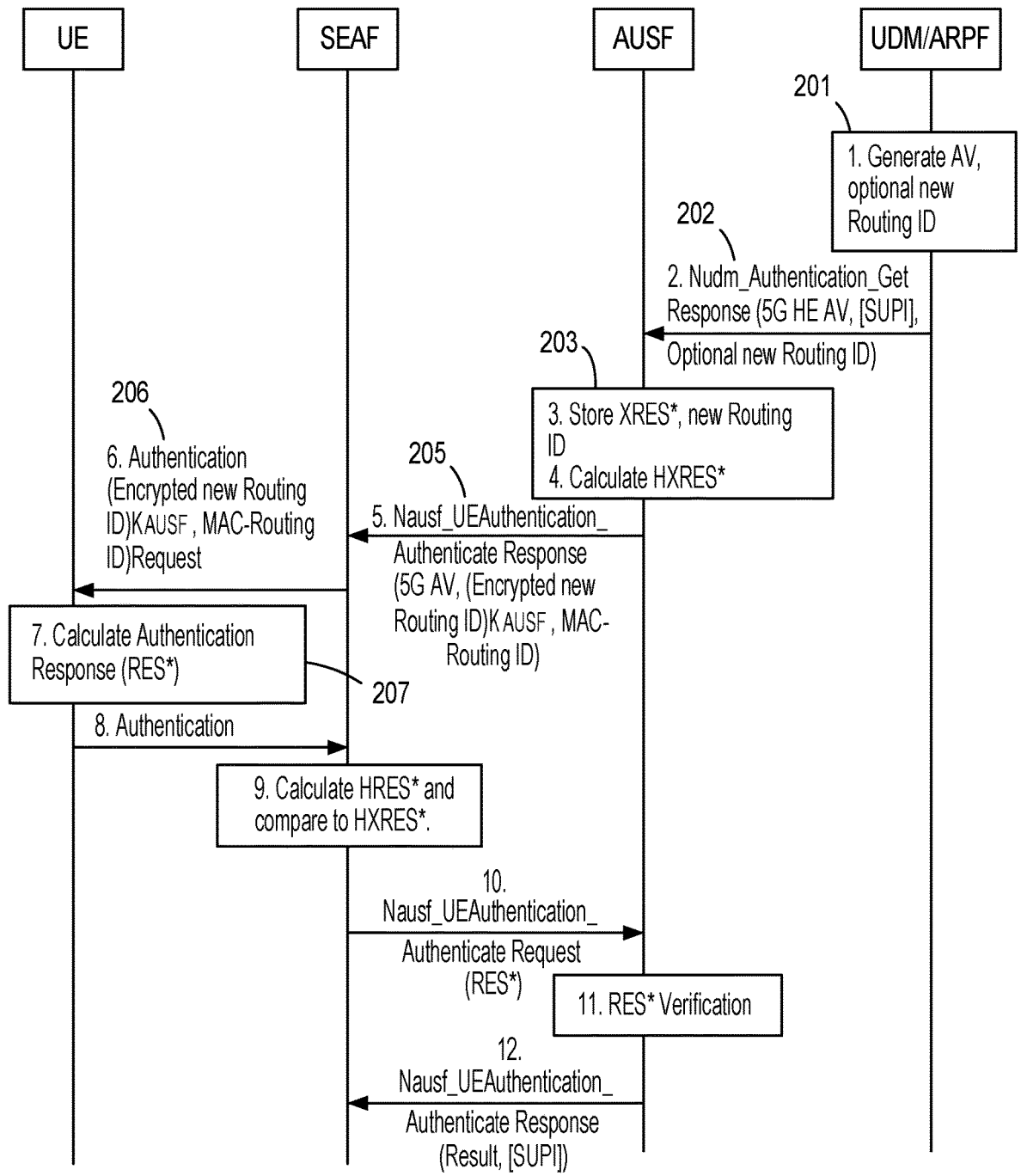
FIG. 2 illustrates an example signaling diagram for a routing ID update procedure, according to certain embodiments.

FIG. 2 illustrates an example signaling or call flow diagram for a routing ID update procedure performed as part of an authentication procedure, according to certain embodiments. As illustrated in the example of FIG. 2, when UDM/authentication credential repository and processing function (ARPF) decides to update the Routing ID, at 201, it obtains or determines a new Routing ID to be assigned to the UE along with Authentication vectors (AV). The UDM/ARPF may obtain or determine the new Routing ID from a configuration file or by any other implementation specific means.

Continuing with the example of FIG. 2, at 202, the new Routing ID parameter may be sent to the AUSF, for example, in a Nudm_Authentication_Get Response message, if an update of the Routing ID is required for the UE (while dealing with an UE authentication attempt). The AUSF may, at 203, store the new Routing ID assigned to the UE. If an update of the Routing ID is required for the UE, at 205, the AUSF may send the new Routing ID parameter to a security anchor function (SEAF)/access management function (AMF), for example, in a Nausf_UEAuthentication_Authenticate Response message. In an embodiment, the new Routing ID may be encrypted using the KAUSF or another key specifically derived for this purpose. The encrypted Routing ID is denoted as "(Encrypted new Routing ID)KAusF" in FIG. 2. In one embodiment, the information sent to the SEAF/AMF at 205 may also contain an additional integrity signature (MAC-Routing ID) to ensure that the content is not altered in the transmission process.

According to certain embodiments, at 206, the SEAF/AMF may send the new Routing ID to the UE, for example as part of the authentication process, or in any NAS message after the authentication is completed. The UE may then check, at 207, the validity of MAC-Routing ID using a key derived from the authentication and key agreement (AKA) procedure and, if the result is positive, the UE deciphers and stores the new Routing ID.

Figure 3A:
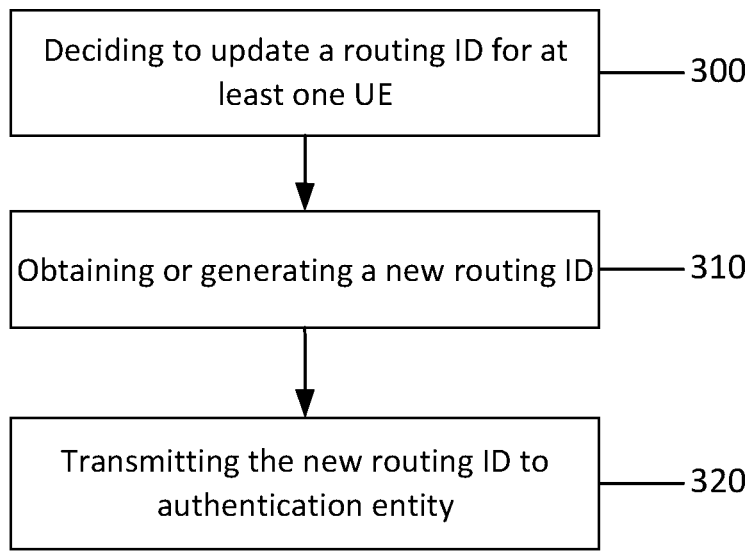
FIG. 3*a* illustrates an example flow diagram of a method for dynamically updating a routing ID, according to one example embodiment.

FIG. 3a illustrates an example flow diagram of a method for dynamically updating a routing ID, according to one example embodiment. In certain example embodiments, the flow diagram of FIG. 3a may be performed by a network entity or network node in a 3GPP system, such as LTE or 5G NR. For instance, in some example embodiments, the method of FIG. 3a may be performed by a UDM/ARPF entity, as depicted in the example of FIG. 2.

In one embodiment, the method of FIG. 3a may include, at 300, deciding to update a routing ID for at least one UE. For example, in some embodiments, the deciding 300 may include deciding to update the routing ID when an operator changes the routing ID configuration for one or more UE(s), when an operator changes the routing ID configuration due to a change in routing ID to group ID mapping, and/or when the UE provides an incorrect routing ID value (i.e., an out of sync scenario). Once it is decided to update the routing ID, the method may include, at 310, obtaining or generating a new routing ID to be assigned to the UE along with authentication vectors (AV). In an embodiment, the obtaining 310 may include obtaining the new routing ID from a configuration file or by any other implementation specific means. In certain embodiments, the method may further include, at 320, transmitting the new routing ID parameter to an authentication server or AUSF, for example, in authentication or registration response message.

Figure 3B:
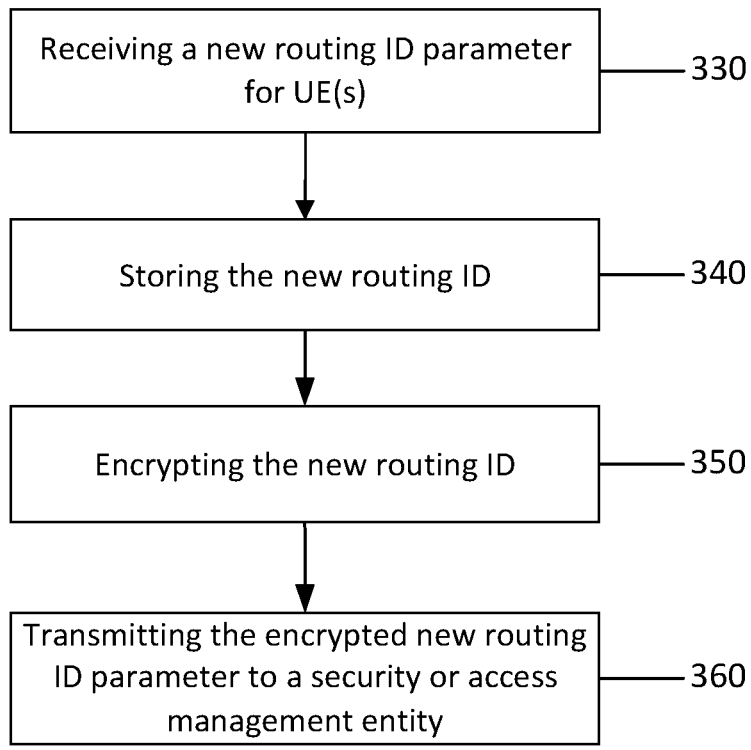
FIG. 3*b* illustrates an example flow diagram of a method for dynamically updating a routing ID, according to one example embodiment.

FIG. 3b illustrates an example flow diagram of a method for dynamically updating a routing ID, according to an example embodiment. In certain example embodiments, the flow diagram of FIG. 3b may be performed by a network entity or network node in a 3GPP system, such as LTE or 5G NR. For instance, in some example embodiments, the method of FIG. 3b may be performed by an authentication server or AUSF, as depicted in the example of FIG. 2.

In an embodiment, the method of FIG. 3b may include, at 330, receiving a new routing ID parameter for a UE(s). For example, the receiving 330 may include receiving the new routing ID in authentication or registration response message from a UDM/ARPF. The method may then include, at 340, storing the new routing ID assigned to the UE(s). The method may then include, at 350, encrypting the new routing ID with KAUSF or another key specifically derived for this purpose. The method may then include, at 360, transmitting the encrypted new routing ID parameter to a SEAF/AMF, for example, in an authentication or registration response message. In one embodiment, the transmitting 360 may include transmitting the information to the SEAF/AMF at 205 with an additional integrity signature (MAC-Routing ID) to ensure that the content is not altered in the transmission process.

Figure 3C:
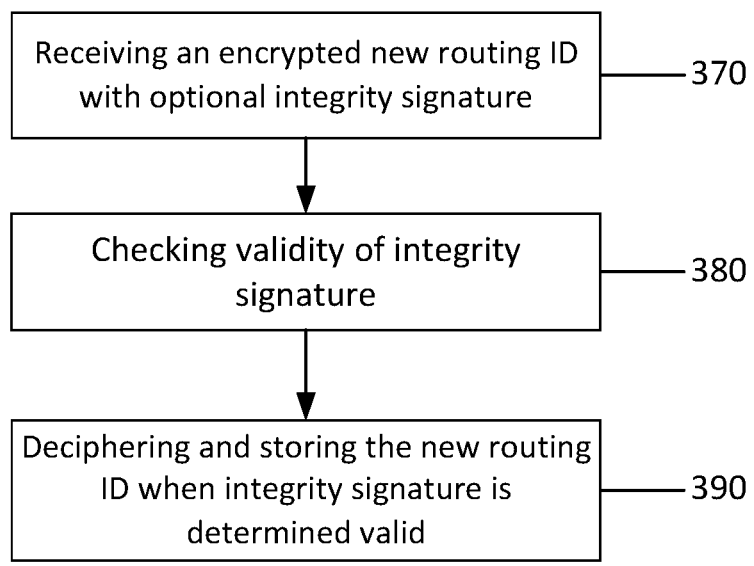
FIG. 3*c* illustrates an example flow diagram of a method for dynamically updating a routing ID, according to one example embodiment.

FIG. 3c illustrates an example flow diagram of a method for dynamically updating a routing ID, according to an example embodiment. In certain example embodiments, the flow diagram of FIG. 3c may be performed by a UE, mobile station, mobile equipment, IoT device, or the like.

In an embodiment, the method of FIG. 3c may include, at 370, receiving an encrypted new routing ID with an additional integrity signature (MAC-Routing ID) from a SEAF. According to some embodiments, the receiving 370 may include receiving the new routing ID as part of the authentication or registration process, or in any NAS message after the authentication is completed. In one embodiment, the method may then include, at 380, checking the validity of the MAC-Routing ID using a key derived from the AKA procedure. If the MAC-Routing ID is valid, the method may then include, at 390, deciphering and storing the new routing ID.

FIG. 4a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), CU of a gNB, WLAN access point, Non 3GPP Interworking Function (like N3IWF), serving gateway (SGW), mobility management entity (MME), a data management entity (e.g., UDM), and/or authentication and processing entity (e.g., ARPF) associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a data management entity (e.g., UDM), and/or authentication and processing entity (e.g., ARPF), or the like. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as the signaling diagram illustrated in FIG. 2 or flow chart of FIG. 3a. For instance, in some examples, apparatus 10 may correspond to or represent UDM/ARPF of FIG. 2. In certain embodiments, apparatus 10 may be configured to perform a procedure for dynamically updating a routing ID.

In one embodiment, apparatus 10 may be controlled by memory 14 and processor 12 to decide to update a routing ID. For example, in some embodiments, apparatus 10 may be controlled by memory 14 and processor 12 to decide to update a routing ID when an operator changes the routing ID configuration for one or more UE(s), when an operator changes the routing ID configuration due to a change in routing ID to group ID mapping, and/or when the UE provides an incorrect routing ID value (i.e., an out of sync scenario). Once it is decided to update the routing ID, apparatus 10 may be controlled by memory 14 and processor 12 to obtain or generate a new routing ID to be assigned to the UE along with authentication vectors (AV). In an embodiment, apparatus 10 may be controlled by memory 14 and processor 12 to obtain the new routing ID from a configuration file or by any other implementation specific means. In certain embodiments, apparatus 10 may be further controlled by memory 14 and processor 12 to transmit the new routing ID parameter to an authentication server or AUSF, for example, in authentication or registration response message.

FIG. 4b illustrates an example of an apparatus 20 according to another example embodiment. In example embodiments, apparatus 20 may be a node or server associated with a radio access network, such as a LTE network, 5G or NR or other radio systems which might benefit from an equivalent procedure. For example, in certain embodiments, apparatus 20 may include authenticating network nodes or functions, such as an authentication server or function (e.g., AUSF).

In some example embodiments, apparatus 20 may include one or more processors, one or more computer-readable storage medium (for example, memory, storage, or the like), one or more radio access components (for example, a modem, a transceiver, or the like), and/or a user interface. In some example embodiments, apparatus 20 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an example embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In example embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, in one example embodiment, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain examples, apparatus 20 may further include a user interface, such as a graphical user interface or touchscreen.

In an example embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR. For instance, in an example embodiment, link 70 may represent the Xn interface.

According to some example embodiments, processor 22 and memory 24 may be included in or may form a part of processing circuitry or control circuitry. In addition, in some example embodiments, transceiver 28 may be included in or may form a part of transceiving circuitry.

As discussed above, according to example embodiments, apparatus 20 may be a network node or functions, such as an authentication server or function. According to certain examples, apparatus 20 may be controlled by memory 24 and processor 22 to perform the functions associated with example embodiments described herein. For instance, in some example embodiments, apparatus 20 may be configured to perform one or more of the processes depicted in any of the diagrams or signaling flow diagrams described herein, such as those illustrated in FIG. 2 and FIG. 3b. As an example, apparatus 20 may correspond to AUSF illustrated in FIG. 2. In example embodiments, apparatus 20 may be configured to perform a procedure for dynamically updating a routing ID.

According to certain embodiments, apparatus 20 may be controlled by memory 24 and processor 22 to receive a new routing ID parameter for a UE. For example, apparatus 20 may be controlled by memory 24 and processor 22 to receive the new routing ID in authentication or registration response message from a UDM/ARPF. In an embodiment, apparatus 20 may then be controlled by memory 24 and processor 22 to store the new routing ID assigned to the UE. According to some embodiments, apparatus 20 may also be controlled by memory 24 and processor 22 to encrypt the new routing ID with KAUSF or another key specifically derived for this purpose. In certain embodiments, apparatus 20 may also be controlled by memory 24 and processor 22 to transmit the encrypted new routing ID parameter to a SEAF/AMF, for example, in an authentication or registration response message. In one embodiment, apparatus 20 may be controlled by memory 24 and processor 22 to transmit the information to the SEAF/AMF with an additional integrity signature (MAC-Routing ID) to ensure that the contents are not altered in the transmission process.

FIG. 4c illustrates an example of an apparatus 30 according to another example embodiment. In an example embodiment, apparatus 30 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, a connected car, or the like. As one example, apparatus 30 may be implemented in, for instance, a wireless handheld device, a wireless plug-in accessory, or the like.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 4c.

As illustrated in the example of FIG. 4c, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 4c, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be a UE, mobile device, mobile station, ME, IoT device and/or NB-IoT device, for example. According to certain example embodiments, apparatus 30 may be controlled by memory 34 and processor 32 to perform the functions associated with example embodiments described herein. For instance, in some embodiments, apparatus 30 may be configured to perform one or more of the processes depicted in any of the diagrams or signaling flow diagrams described herein, such as those illustrated in FIG. 2 and FIG. 3*c*. As an example, apparatus 30 may correspond to one or more of the UE(s) illustrated in FIG. 2.

According to certain embodiments, apparatus 30 may be controlled by memory 34 and processor 32 to receive an encrypted new routing ID along with an optional integrity signature (MAC-Routing ID) from a SEAF. According to some embodiments, apparatus 30 may be controlled by memory 34 and processor 32 to receive the new routing ID as part of the authentication or registration process, or in any NAS message after the authentication is completed. In one embodiment, apparatus 30 may be controlled by memory 34 and processor 32 to check the validity of the MAC-Routing ID using a key derived from the AKA procedure. If the MAC-Routing ID is valid, apparatus 30 may be controlled by memory 34 and processor 32 to decipher and store the new routing ID.

Therefore, certain example embodiments provide several technical improvements, enhancements, and/or advantages. For example, certain embodiments allow for the flexible configuration of Routing ID in the operator network. In addition, some example embodiments provide the ability to leverage dynamic signaling to seamlessly correct out-of-sync configuration, also in case of network re-configurations, etc. Further, certain embodiments are able to perform the assignment of the Routing ID in a secured, tamper proof manner. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20 or apparatus 30), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments.

We claim:

1. An apparatus, comprising:
at least one processor; and
at least one memory comprising computer program code,
the at least one memory and computer program code configured, with the at least one processor, to cause the apparatus at least to:
receive an encrypted new routing identifier with an integrity signature from a security or access management entity, wherein the encrypted new routing identifier is received in a non-access stratum message after authentication of the apparatus is completed;
check a validity of the integrity signature using a key; and
if the integrity signature is valid, decipher and store the new routing identifier.

2. The apparatus according to claim 1, wherein check the validity of the integrity signature using a key comprising using an integrity key to check the validity of the integrity signature.

3. The apparatus according to claim 2, wherein the integrity key is known only by the apparatus and a node of the home public land mobile network of the apparatus.

4. The apparatus according to claim 1, wherein decipher the encrypted new routing identifier further comprising decipher the encrypted new routing identifier using an encryption key.

5. The apparatus according to claim 4, wherein the encryption key is known only by the apparatus and a node of the home public land mobile network of the apparatus.

6. The apparatus according to claim 1, wherein the at least one memory and computer program code are further configured, with the at least one processor, to cause the apparatus at least to receive the new routing identifier as part of a configuration, authentication or registration process.

7. A method, comprising:
receiving by an apparatus an encrypted new routing identifier with an integrity signature from a security or access management entity, wherein the encrypted new routing identifier is received in a non-access stratum message after authentication of the apparatus is completed;
checking a validity of the integrity signature using a key; and
if the integrity signature is valid, deciphering and storing the new routing identifier.

8. The method according to claim 7, wherein checking the validity of the integrity signature using a key further comprising using an integrity key to check the validity of the integrity signature.

9. The method according to claim 8, wherein the integrity key is known only by the apparatus and a node of the home public land mobile network of the apparatus.

10. The method according to claim 7, wherein deciphering the encrypted new routing identifier further comprising deciphering the encrypted new routing identifier using an encryption key.

11. The method according to claim 10, wherein the encryption key is known only by the apparatus and a node of the home public land mobile network of the apparatus.

12. The method according to claim 7, wherein receiving the new routing identifier is part of a configuration, authentication or registration process of the apparatus.

13. An apparatus, comprising:
at least one processor; and
at least one memory comprising computer program code,
the at least one memory and computer program code configured, with the at least one processor, to cause the apparatus at least to:
decide at the apparatus to update a routing identifier for at least one user equipment;
obtain or generate a new routing identifier to be assigned to the at least one user equipment;
encrypt the new routing identifier with an encryption key;
generate an integrity signature of the encrypted new routing identifier with an integrity key; and
transmit the encrypted new routing identifier with the integrity signature in a non-access stratum message to the at least one user equipment after authentication of the at least one user equipment is completed.

14. The apparatus according to claim 13, wherein the encryption key and the integrity key are known only by the at least one user equipment and the apparatus.

15. The apparatus according to claim 14, wherein transmit the encrypted new routing identifier with the integrity signature to the at least one user equipment further comprising send a non-access stratum message that comprising the encrypted new routing identifier to the at least one user equipment.

16. The apparatus according to claim 15, further comprising send the non-access stratum message to the at least one user equipment after an authentication of the at least one user equipment is completed or as part of a configuration, authentication or registration process.

* * * * *